July 30, 1946.   A. A. DURANT   2,405,021
INSULATED PIPE
Filed June 7, 1944
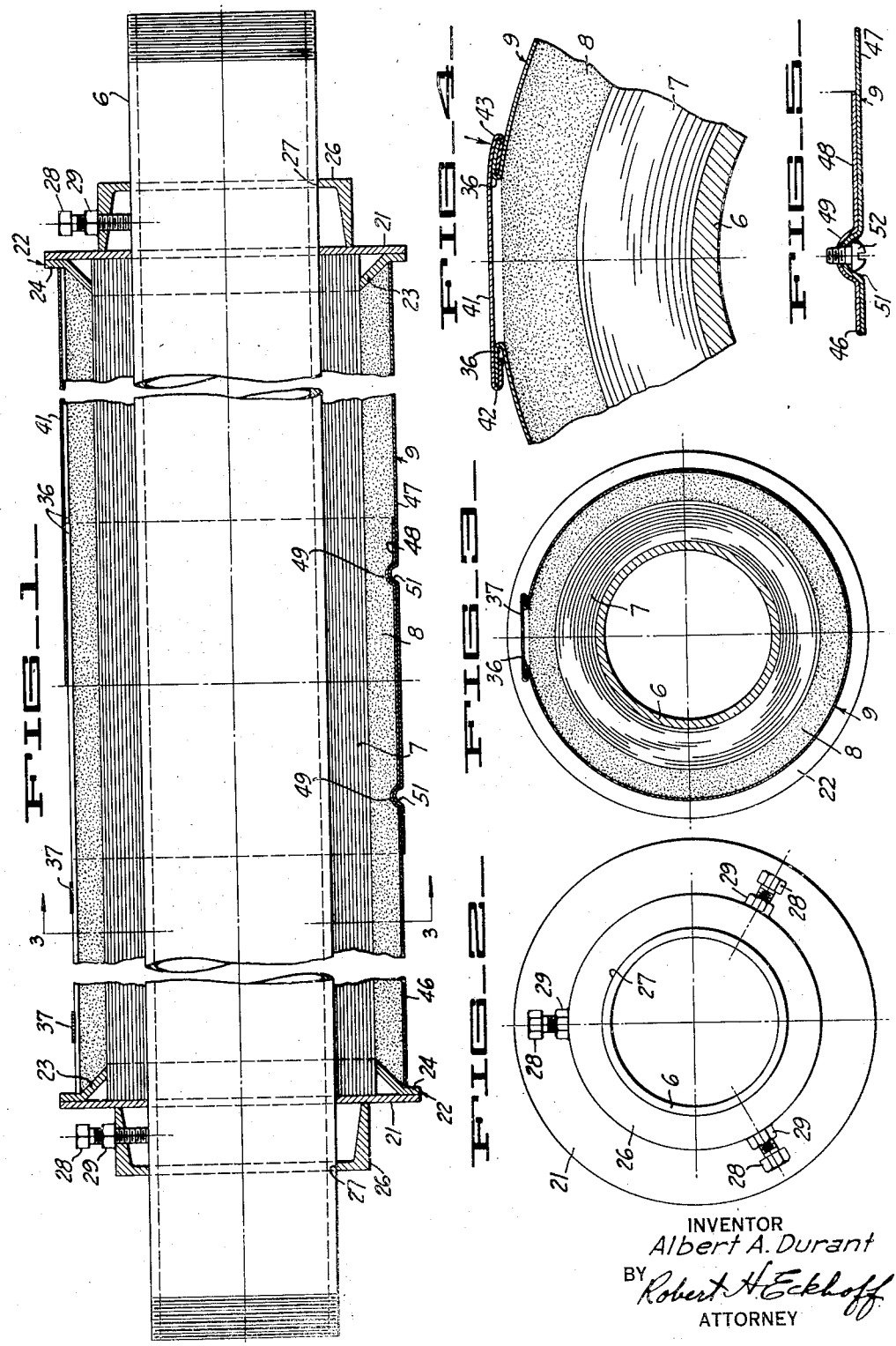
INVENTOR
*Albert A. Durant*
BY *Robert H. Eckhoff*
ATTORNEY

Patented July 30, 1946

2,405,021

UNITED STATES PATENT OFFICE 2,405,021

INSULATED PIPE

Albert A. Durant, Honolulu, Territory of Hawaii

Application June 7, 1944, Serial No. 539,084

1 Claim. (Cl. 154—28)

This invention relates to improvements in insulated pipe.

In my Patent No. 1,709,344 of April 23, 1929, I disclosed the manufacture of insulated pipe wherein a length of conduit pipe was surrounded with a layer of suitable heat insulating material such as air cell, wool felt, magnesia, cork. Generally, the heat insulating material is first placed concentrically about the pipe. An outer metal shield is then positioned as a mold for a bituminous material which is poured into the shield to provide an exterior covering for the heat insulating material. In my Patent No. 2,129,680 of September 13, 1938, I disclosed manufacture of the heat insulated pipe in conjunction with a centering device so that a uniform layer of the bituminous material could be poured into the space between the outside metal sheath and the insulating material. In my first mentioned patent I proposed that terminal edges of the sheet be spaced apart and temporarily left in this condition to permit pouring of the fluent bituminous material. According to another practice, the outer metal sheath was formed with small spaced holes. After the asphalt was poured, voids existed between the pouring holes under the sheath. The insulated pipe manufactured by these methods was quite satisfactory when the pipe was transported only a short distance from the factory. However, with the rapidly increasing demand for the pipe and with necessity for transporting it for use over relatively great distances, the pipe was not entirely satisfactory. The seal so provided was not sufficiently tight and permanent. I have now devised a metal shield structure which enables the fluent bituminous material to be poured readily after which the shield is so closed as to provide a substantially permanent cover for the pipe.

It is in general the broad object of the present invention to provide an improved insulated pipe of the character described.

Another object of the present invention is to provide an improved arrangement and means for positioning the outer protecting metal sheet in a pipe of the character described.

With the increase in use of the insulated pipe of the present invention, it has been found desirable to increase the length of conduit pipe which is insulated. It is not uncommon to insulate relatively long lengths of pipe. The fashioning and handling of an outer metal protecting sheet of requisite length is costly and relatively difficult.

Another object of the invention is to provide for utilization of sheets of shorter length, fashioning two or more of these to provide the outer protecting shield for a length of pipe.

The invention includes other objects and features of advantage, some of which, together with the foregoing, will appear hereinafter wherein the present proposed form of insulated pipe of this invention is disclosed.

In the drawing accompanying and forming a part hereof, Figure 1 is a side elevation partly in section of an insulated pipe embodying the present invention.

Figure 2 is an end elevation of the pipe shown in Figure 1.

Figure 3 is a section taken along the line 3—3 in Figure 1.

Figure 4 is an enlarged view showing completion of the closure of the protecting metal sheet.

Figure 5 is an enlarged view showing the arrangement utilized for joining together several lengths of protecting metal sheathing.

Referring more particularly to the drawing, numeral 6 indicates a length of pipe through which gases or liquids are conveyed, it being of course understood that the pipes are formed in sections of the desired length and that the ends of each section are suitably formed as with screw threads to enable each section to be joined to another section.

Surrounding the pipe 6 is an insulating material indicated at 7. Any of the well known insulating materials can be used. It is preferred, however, to employ a material of a character such that the material can be molded, and is obtainable in definite lengths. Example of suitable material is that known in the trade as Asbestos Cell, wool felt pipe covering and magnesium pipe covering. The insulating material is enveloped by a layer of a suitable bituminous material indicated at 8, which is fluent only at an elevated temperature not encountered in the normal use of the pipe.

An outer metal jacket or sheet 9 serves to protect the bituminous material and the insulating material, providing a mold for the bituminous material which is introduced in a fluent condition between the insulating material and the interior surface of the jacket, as will presently be described.

The centering device disclosed in my Patent No. 2,129,680 is conveniently employed to ensure that the metal jacket and the layer of bituminous material are concentrically positioned about the pipe. This centering device includes a base or main member 21 which may advantageously be formed from a piece of sheet metal as a substantially circular disc. At its center the base 21 is formed with an opening for receiving the pipe 6, the opening being preferably only sufficiently large to enable the pipe to be inserted. Disposed on one side of the base member is an element 22 having a forwardly projecting portion 23 provided with an exterior conical surface which is cooperable with the adjacent end of the metal jacket or sheet 9. The forward end of the conical portion 23 is formed with an opening just large enough to enable the insulating material to be inserted therein and abut against the base 21. While the base of the conical portion 23 is shown in the drawing to be of substantially the same diameter as the jacket 9, it will be appreciated that in order to center the jacket properly with respect to the pipe, it must not be of less diameter than the final diameter of the jacket, but may of course be of greater diameter, in which case the jacket rides on conical portion 23. Element 22 may be formed of sheet metal and the base of the cone preferably merges into a plate-like ring portion 24 which is secured to the base.

Secured on the outside of each base 21 is a flanged ring 26 which is apertured as at 27 to pass the pipe. Several studs indicated at 28 are carried by this ring and are spaced about the periphery of the ring and serve to center the base 21 on the pipe and, at the same time, to secure the base in position wherein it retains the assembled lengths of insulated material and the metal jacket 9 in position.

In the manufacturing of each insulated pipe section, a pair of centering devices is used. One convenient method of associating them with the partly formed conduit is to first place one centering device at one end of the pipe and firmly lock it in place with the several studs 28 and the locknuts 29. The insulating material is then placed about the pipe; the other centering devise is then placed on the other end of the pipe and secured, the insulating material being pressed between the two centering devices. The jacket 9, made up to the correct length, is then positioned. Being made up of a simple sheet of material, it is readily sprung and then brought into position on the centering devices. The width of the sheet is such that when centered about the pipe a longitudinal slot opening is left between the adjacent terminal edges of the sheet, the width of the sheet being less than the circumference of the circle in which the sheet is placed about the pipe. The sheet is flanged as at 36 along each terminal edge and one or more narrow clips 37 are secured to these flanged edges at spaced points along the sheet to retain the sheet in place on the centering devices, until the fluent bituminous material has been poured. When the bituminous material has cooled, or before that if desired, the clips are removed and are replaced by a permanent closure cap indicated generally at 41 and comprising a relatively long, narrow sheet of metal having its terminal edges flanged inwardly as at 42 and adapted to cooperate with the flanged edges 36 on the sheet 9. The cap can be slid into place or it can be sprung into place, as desired. When positioned the inter-engaged edges of the cap and sheet are generally hammered down, as is indicated at 43 on the right hand side of Figure 4.

When one employs relatively long pipe sections, it becomes increasingly difficult to work with metal sheets of sufficient length and to form these to the correct length. A simple and ready means for accomplishing this is provided by employing a metal jacket or sheath made up of several sections of metal sheet. For example, in the form of pipe covering shown in Figures 1 and 5, I have employed two metal sheet sections 46 and 47. Adjacent the circumferential terminal edge 48 of sheet 46 one or more grooves 49 are formed circumferentially. Similar circumferential grooves 51 are formed in sheet 47. When the two sheets are placed in overlapping relationship with one or more of the grooves on each sheet inter-engaged, a smooth continuous surface is provided. The sheets are retained in engagement with one another by inserting one or more metal screws 52 at spaced points along each circumferential groove. In this way the several pipe sections are joined together and form a rigid unit. Also, by providing the circumferential grooves at spaced points adjacent the terminal edges of each sheet, the several sheets can be readily inter-engaged to provide a sheath of any desired length. In place of utilizing a metal screw, one can weld the sheets or otherwise join them together.

I claim:

The method of making protected pipe which comprises covering a length of pipe with heat insulation, positioning a metal sheet along the length of said pipe substantially concentrically about but in spaced relation to said covered pipe, said sheet being tubular in cross-section with the adjacent longitudinal terminal edges thereof being parallel and closely adjacent but spaced apart to provide a narrow, slot-like opening into the space between said tubular sheet and the covered pipe, said opening extending along the length of the covered pipe length placing temporary seals at the end of the sheet metal tube, pouring a bituminous material into the space between the sheet and the covered pipe through said narrow, slot-like opening removing the temporary seals, positioning a separate cover member over said slot-like opening joining said sheet edges together to enclose said pipe along the covered length thereof, and pressing the engaged edges of the cover member and tubular sheet to lock them permanently into position.

ALBERT A. DURANT.